(12) United States Patent
Yoshikawa et al.

(10) Patent No.: US 7,653,805 B2
(45) Date of Patent: Jan. 26, 2010

(54) PROCESSING IN PIPELINED COMPUTING UNITS WITH DATA LINE AND CIRCUIT CONFIGURATION RULE SIGNAL LINE

(75) Inventors: Takashi Yoshikawa, Kanagawa-ken (JP); Shigehiro Asano, Kanagawa-ken (JP); Yutaka Yamada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 262 days.

(21) Appl. No.: 11/727,134

(22) Filed: Mar. 23, 2007

(65) Prior Publication Data

US 2007/0245131 A1 Oct. 18, 2007

(30) Foreign Application Priority Data

Mar. 24, 2006 (JP) ............................. 2006-084190

(51) Int. Cl.
*G06F 15/76* (2006.01)
(52) U.S. Cl. .............................. 712/37; 712/18; 712/19
(58) Field of Classification Search ........................ None
See application file for complete search history.

(56) References Cited

U.S. PATENT DOCUMENTS

| | | | | |
|---|---|---|---|---|
| 6,108,760 | A * | 8/2000 | Mirsky et al. ................ | 711/203 |
| 6,842,854 | B2 * | 1/2005 | Nishihara et al. ........... | 712/228 |
| 7,315,933 | B2 * | 1/2008 | Nishijima .................... | 712/10 |
| 7,348,798 | B2 * | 3/2008 | Marui .......................... | 326/41 |
| 7,365,566 | B2 * | 4/2008 | Aoyama et al. ............... | 326/39 |
| 7,401,134 | B2 * | 7/2008 | Velez et al. .................. | 709/221 |
| 7,496,692 | B2 * | 2/2009 | Holm et al. .................... | 710/8 |
| 2004/0103264 | A1 | 5/2004 | Fujii et al. | |

FOREIGN PATENT DOCUMENTS

JP 2005-128709 5/2005

OTHER PUBLICATIONS

Goldstein et al., "Piperench: A Reconfigurable Architecture and Compiler", IEEE, Computer, vol. 33, Issue 4, pp. 70-77, (2000).

* cited by examiner

*Primary Examiner*—Kenneth S Kim
(74) *Attorney, Agent, or Firm*—Finnegan, Henderson, Farabow, Garrett & Dunner, L.L.P.

(57) ABSTRACT

A semiconductor device for performing data processing by performing a plurality of computations in cycles includes a pipeline formed by connecting a plurality of computing units in series, each of the computing units including: a data line for receiving data; a control line for receiving a rule signal; a circuit information control unit configured to store, before data processing, several circuit information items, and to output a first one of the several circuit information items according to the rule signal received via the control line in a first cycle of the data processing; a processing element configured to construct an execution circuit according to the first circuit information item, to perform a computation using data from the data line, and to output a computation result; a data register for storing the computation result, and for outputting the computation result in a second cycle; and a control register for storing the rule signal and for outputting the rule signal in the second cycle. The semiconductor further includes a controller configured to control output timing of the rule signal to the control line of a first-stage one of the computing units in the pipeline and to control output timing of the data to the data line of the first-stage computing unit in the first cycle, so that the plurality of computing units are operated as a pipeline.

10 Claims, 12 Drawing Sheets

| HIGHER BITS | LOWER BITS | CIRCUIT INFORMATION ADDRESS | CIRCUIT INFORMATION VALIDITY SIGNAL |
|---|---|---|---|
| 000 | 00-11 | 00-11 | 10000 (STORED IN UNIT 10A) |
| 001 | 00-11 | 00-11 | 01000 (STORED IN UNIT 10B) |
| 010 | 00-11 | 00-11 | 00100 (STORED IN UNIT 10C) |
| 011 | 00-11 | 00-11 | 00010 (STORED IN UNIT 10D) |
| 100 | 00-11 | 00-11 | 00001 (STORED IN UNIT 10E) |
| 101 | 00-11 | 00 | 00000 (NOT STORED IN UNIT 10A-10E) |

| INPUT ADDRESS | Valid0 | RECONFIGURATION RULE ID | Valid1 | OUTPUT ADDRESS | Valid2 |
|---|---|---|---|---|---|
| INPUT ADDRESS | Valid0 | RECONFIGURATION RULE ID | Valid1 | OUTPUT ADDRESS | Valid2 |
| ... | | | | | |
| INPUT ADDRESS | Valid0 | RECONFIGURATION RULE ID | Valid1 | OUTPUT ADDRESS | Valid2 |

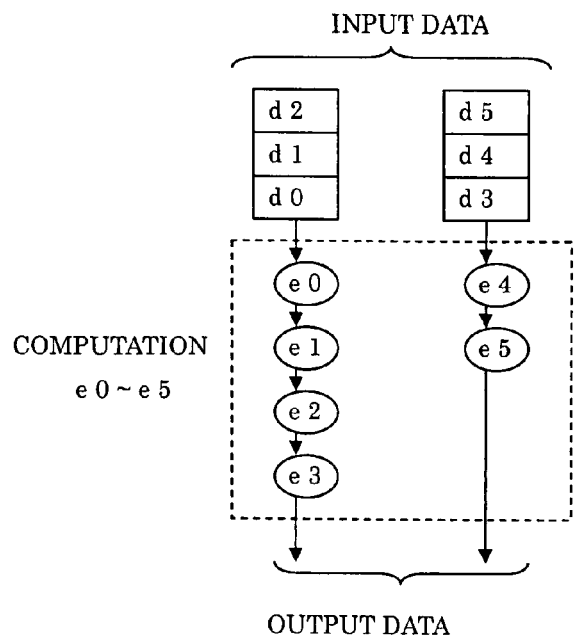

FIGURE 12

|  | COMPUTING UNIT 10A | COMPUTING UNIT 10B |
|---|---|---|
| CIRCUIT INFORMATION REGISTER 1011 (REFERENCE NO. 0) | CIRCUIT INFORMATION A0 (CIRCUIT FOR COMPUTATION e0) | CIRCUIT INFORMATION B0 (CIRCUIT FOR COMPUTATION e1) |
| CIRCUIT INFORMATION REGISTER 1011 (REFERENCE NO. 1) | CIRCUIT INFORMATION A1 (CIRCUIT FOR COMPUTATION e4) | CIRCUIT INFORMATION B1 (CIRCUIT FOR COMPUTATION e5) |
| CIRCUIT INFORMATION REGISTER 1011 (REFERENCE NO. 2) | CIRCUIT INFORMATION A2 (CIRCUIT FOR COMPUTATION e2) | CIRCUIT INFORMATION B2 (CIRCUIT FOR COMPUTATION e3) |

FIGURE 13

| RECONFIGURATION RULE | INITIAL VALUE | MINIMUM VALUE | MAXIMUM VALUE | OUTPUT OPERATION |
|---|---|---|---|---|
| s 0 | 0 | 0 | 0 | 0→0→0→0→... |
| s 1 | 1 | 0 | 1 | 1→0→1→0→... |
| s 2 | 2 | 1 | 2 | 2→1→2→1→... |
| s 3 | 2 | 2 | 2 | 2→2→2→2→... |

PROCESSING IN PIPELINED COMPUTING UNITS WITH DATA LINE AND CIRCUIT CONFIGURATION RULE SIGNAL LINE

CROSS-REFERENCE TO RELATED APPLICATIONS

This application is based upon and claims the benefit of priority from prior Japanese Patent Application No. 2006-84190, filed Mar. 24, 2006, the entire contents of which are incorporated herein by reference.

BACKGROUND OF THE INVENTION

1. Field of the Invention

The present invention relates to a semiconductor device employing dynamically reconfigurable circuit technology.

2. Description of the Related Art

In recent years, the functionality and complexity of portable electronic devices, and other devices that require low cost and power consumption, has increased. In order to maintain high performance and low power consumption, development and manufacture of dedicated hardware are indispensable techniques. However, as device complexity increases and more functionality is required of devices, the costs of development and manufacture of dedicated device hardware increases. Much attention is now being paid to semiconductor devices employing dynamically reconfigurable circuit technology, as such devices are capable of reducing such manufacture and development costs.

Semiconductor devices using dynamically reconfigurable circuit technology are equipped with a reconfigurable circuit such as an FPGA and a storage device for storing several pieces of circuit information. The circuit information is used for constructing various circuits (hereinafter referred to as "execution circuits") that are part of the reconfigurable circuit. Execution circuits can be constructed during operation by reading circuit information according to rules that are determined in advance by software or the like. Reconfigurable devices are different from conventional semiconductor devices using an FPGA in that they can change execution circuits during operation.

Reconfigurable semiconductor devices are expected not only to reduce the development cost of dedicated hardware like FPGAs do, but also to reduce the manufacturing cost of dedicated hardware. The manufacturing cost is expected to be reduced because a variety of functions can be implemented on a small semiconductor device by dynamically constructing execution circuits.

Known examples of semiconductor devices employing dynamically reconfigurable circuit technology are the DRP (dynamically reconfigurable processor) by NEC Electronics Corporation and PipeRench by Carnegie Mellon University.

The DRP has a structure using PEs (processing elements) as basic elements for computation. The PEs are arranged as a two-dimensional array, and a state transition controller is located at the center of the PE arrangement. The PEs are computing devices capable of constructing execution circuits. Several pieces of circuit information are stored in an instruction memory provided in each PE. The circuit information can include the type of computation to be performed by the PE, or information on connections between PEs. Each PE dynamically constructs an execution circuit by reading the circuit information from an instruction memory. The instruction memory is read at a location determined by an instruction pointer that is provided by a state transition controller.

In PipeRench, several PEs are used as basic elements for computation and a "stripe" (the PEs and a bus connecting the PEs) is used to connect the PEs in a pipeline. The PEs are computing devices capable of constructing execution circuits. The PEs are connected via a global bus to a control device which is located outside PipeRench. Circuit information such as the type of computation to be performed by a PE, or information on bus connections for each PE, is transferred from the control device located outside PipeRench to each PE via the global bus. Each PE dynamically constructs an execution circuit according to the circuit information.

To achieve good performance with a dynamically reconfigurable semiconductor device, it is desirable to shorten the time necessary to reconfigure the device. The steps in reconfiguring the device include: determining the circuit information to be used for construction of an execution circuit; constructing an execution circuit according to the circuit information; and performing a computation on input data that arrives approximately when the execution circuit is constructed.

In PipeRench, the external control device transfers circuit information directly to each PE in order to construct the execution circuits. Thus, there can be a long delay between when the control device determines what circuit information to use and the construction of the execution circuits in the PEs. The result is that it may take a long time to reconfigure the device.

In the DRP, each PE is configured to store several pieces of circuit information in an instruction memory. When constructing an execution circuit, each PE reads out circuit information from the instruction memory. Thus, the time taken for transferring circuit information is shortened and it may take less time to reconfigure the device.

In the DRP, the state transition controller first detects an event that input data has reached a PE. Then the state transition controller determines the circuit information necessary to construct an execution circuit in the PE, and gives the PE an instruction pointer. The PE then reads the circuit information from the instruction memory at the location identified by the instruction pointer.

Thus, the circuit information required to construct an execution circuit is not determined until the arrival of the input data at the PE. This can lengthen the amount of time that is required to reconfigure the device.

Even if dynamically reconfigurable circuits were connected to each other in the same manner as in PipeRench and the DRP approach were used to reconfigure the device, the possibility of delay would still exist.

SUMMARY OF THE INVENTION

A semiconductor device for performing data processing by performing a plurality of computations in cycles according to the invention includes a pipeline formed by connecting a plurality of computing units in series, each of the computing units including: a data line for receiving data; a control line for receiving a rule signal; a circuit information control unit configured to store, before data processing, several circuit information items, and to output a first one of the several circuit information items according to the rule signal received via the control line in a first cycle of the data processing; a processing element configured to construct an execution circuit according to the first circuit information item, to perform a computation using data from the data line, and to output a computation result; a data register for storing the computation result, and for outputting the computation result in a second cycle; and a control register for storing the rule signal and for outputting the rule signal in the second cycle. The semiconductor device further includes a controller configured to control output timing of the rule signal to the control line of a first-stage one of the plurality of computing units in the pipeline and to control output timing of the data to the data line of the first-stage computing unit in the first cycle, so that the plurality of computing units are operated as a pipeline.

A semiconductor device for performing data processing by performing a plurality of computations in cycles according to the invention includes a controller; a buffer for holding data to be subjected to data processing and for outputting the data according to an instruction from the controller; a first computing unit configured to construct a first execution circuit according to a first one of several circuit information items stored in advance, the first piece of circuit information being selected according to a rule signal from the controller, perform a computation on data from the buffer using the first execution circuit, store a computation result, and store the rule signal from the controller, in a first cycle; and a second computing unit configured to construct a second execution circuit according to a second one of several items of circuit information stored in advance, the second item of circuit information being selected according to the rule signal stored by the first computing unit, and perform a computation on the computation result stored by the first computing unit using the second execution circuit, in a second cycle.

A semiconductor device for computing a data item on a cycle-by-cycle basis according to a rule signal supplied from a controller according to the invention includes a processing element configured to construct an execution circuit according to received circuit information, perform computations on received data using the execution circuit, and output a computation result; a circuit information register for storing several circuit information items to be supplied to the processing element; and a selection control device comprising a loop counter for counting on a cycle-by-cycle basis, the loop counter being set to a minimum value after reaching a maximum value, wherein the controller inputs, in a first cycle, a rule signal to the selection control device, the rule signal including an initial value, the minimum value, and the maximum value; wherein, in the first cycle, the selection control device selects a first one of the several circuit information items that corresponds to the initial value and sets the initial value, the minimum value, and the maximum value in the loop counter; and wherein, in a second cycle where the controller does not input a rule signal, the selection control device selects a second one of the several circuit information items, the second item of circuit information corresponding to a value that is output from the loop counter.

A method in accordance with another embodiment of the invention of controlling a pipeline formed by connecting a plurality of computing units in series, each of the computing units includes a data line for receiving data, a control line for receiving a rule signal, a circuit information control unit configured to store, before data processing, several circuit information items, and to output a first one of the several circuit information items according to the rule signal received via the control line in a first cycle of the data processing; a processing element configured to construct an execution circuit according to the first circuit information item, to perform a computation using data from the data line, and to output a computation result; a data register for storing the computation result, and for outputting the computation result in a next cycle; and a control register for storing the rule signal and for outputting the rule signal in the next cycle. The method of controlling the pipeline includes controlling output timing of the rule signal to the control line of the computation pipeline; and controlling output timing of data to the data line of a first-stage one of the plurality of computing units in the first cycle, so that the plurality of computing units are operated as a pipeline.

BRIEF DESCRIPTION OF THE DRAWINGS

FIG. 8 is an exemplary structure of code that is stored in an execution control memory;

FIG. 11 illustrates computations performed in an exemplary operation of a semiconductor device;

FIG. 12 illustrates exemplary content of circuit information registers;

FIG. 13 illustrates exemplary reconfiguration rules; and

DESCRIPTION OF THE PREFERRED EMBODIMENTS

A semiconductor device according to an embodiment of the present invention will be hereinafter described in detail with reference to the drawings. The invention is not limited to this embodiment.

Figure 1:
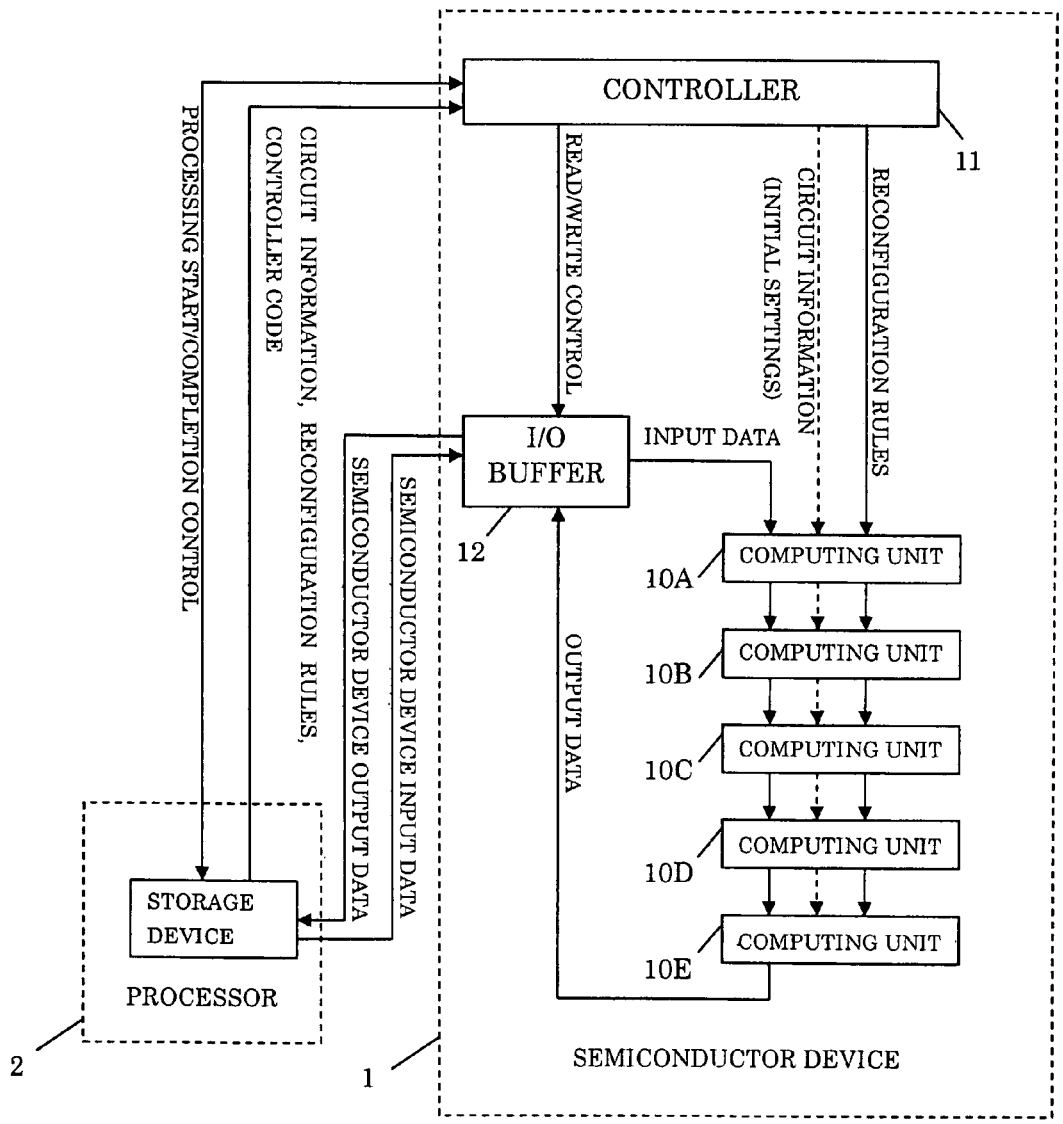
FIG. 1 is a block diagram of a semiconductor device according to an embodiment of the present invention.

FIG. 1 is a block diagram of a semiconductor device 1 according to an embodiment of the invention. The semiconductor device 1 performs data processing according to signals from an external device such as a processor 2, and has five computing units 10A-10E, a controller 11, and an input/output buffer 12. The controller 11 is connected to the computing unit 10A and the input/output buffer 12. The computing units 10A and 10E are connected to the input/output buffer 12.

In this specification, the term "data processing" (or "data-handing process)" is a generic term for a series of computations. The term "cycle" means a minimum time unit in a synchronous circuit between a change of values in a storage device to a subsequent change of the values in the storage device.

The five computing units 10A-10E perform data processing, and are pipelined together. The pipeline is implemented by transferring data, circuit information, and a rule signal ("reconfiguration rule") from the computing unit 10A through computing units 10B, 10C, and 10D, to computing unit 10E. The transfers are from one computing unit to the next, and they occur each cycle. The data is pipelined by obtaining computation results sequentially and transferring the results between computing units 10A-10E. The same circuit information and reconfiguration rule are transferred to all the computing units 10A-10E, but the circuit information and reconfiguration rule are used only in a particular computing unit or units.

The input/output buffer 12 temporarily stores data provided by the semiconductor device 1. The stored data can be provided for the computing unit 10A at the start of data processing, or can be an intermediate or final result of data processing by the semiconductor device 1. Initial input data can be written to the input/output buffer 12 by an external device such as the processor 2 before the start of data processing. Semiconductor device 1 can also use an intermediate result from input/output buffer 12 in order to continue data processing using. A final result stored in the input/output buffer 12 can be read from the input/output buffer 12 by an external device such as the processor 2.

The controller 11 can set circuit information in storage sections of the respective computing units 10A-10E before starting data processing. The controller 11 can also send reconfiguration rules each cycle according to code recorded in a storage section of the controller 11. The controller 11 can also control reading data from and writing data to the input/output buffer 12 each cycle according to the same code.

Before the start of data processing, circuit information, reconfiguration rules, and code are sent from the external device such as the processor 2 to the controller 11. The circuit information is used for initial setting of the computing units 10A-10E, and the code prescribes operation of the controller 11. A signal to start data processing is communicated from the external device such as the processor 2 to the controller 11. When the processing has completed, the controller 11 sends a notice to that effect to the external device such as the processor 2.

Each of the computing units 10A-10E has a computing element capable of constructing an execution circuit for performing each computation. The computing units 10A-10E perform computations on input data and output a computation result. The computations and output are performed while the computing units 10A-10E constructs an execution circuit in the computing element according to an instruction from the controller 11. Although this embodiment employs five computing units 10A-10E, the number of computing units is not limited to five and may be changed in accordance with the processing ability required for the semiconductor device 1.

Figure 2:
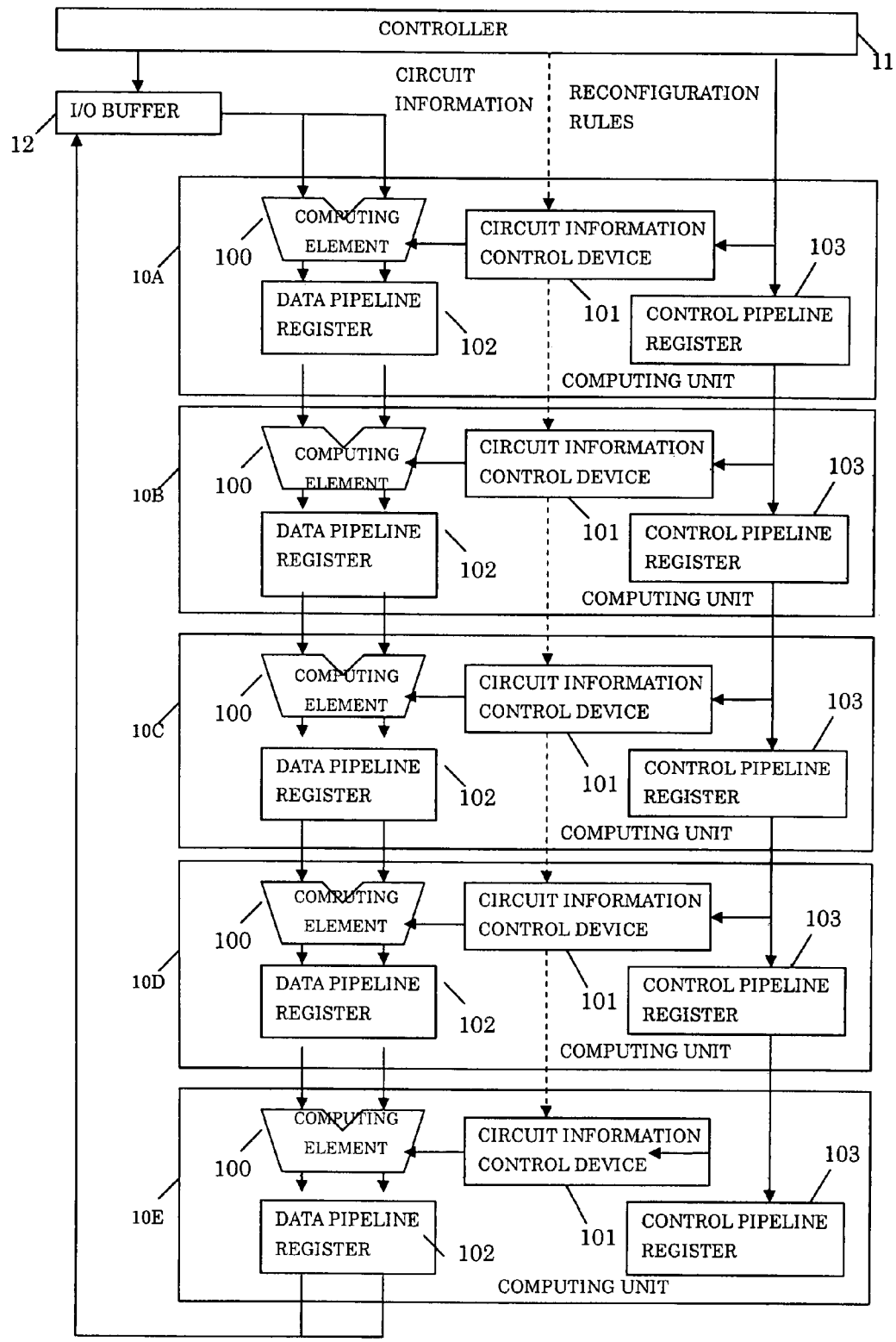
FIG. 2 is a block diagram of several computing units.

FIG. 2 is a block diagram of computing units 10A-10E. Each of the computing units 10A-10E has a computing element 100, a circuit information control device 101, a data pipeline register 102, and a control pipeline register 103. The output of the computing element 100 is connected to the data pipeline register 102, and the circuit information control device 101 is connected to the computing element 100.

The computing element 100 is a computing element capable of constructing a hardware execution circuit for performing computations. Thus, the computing element 100 performs a computation on input data and writes a computation result to the data pipeline register 102 while constructing an execution circuit. The execution circuit is constructed according to circuit information received from the circuit information control device 101.

Figure 3:
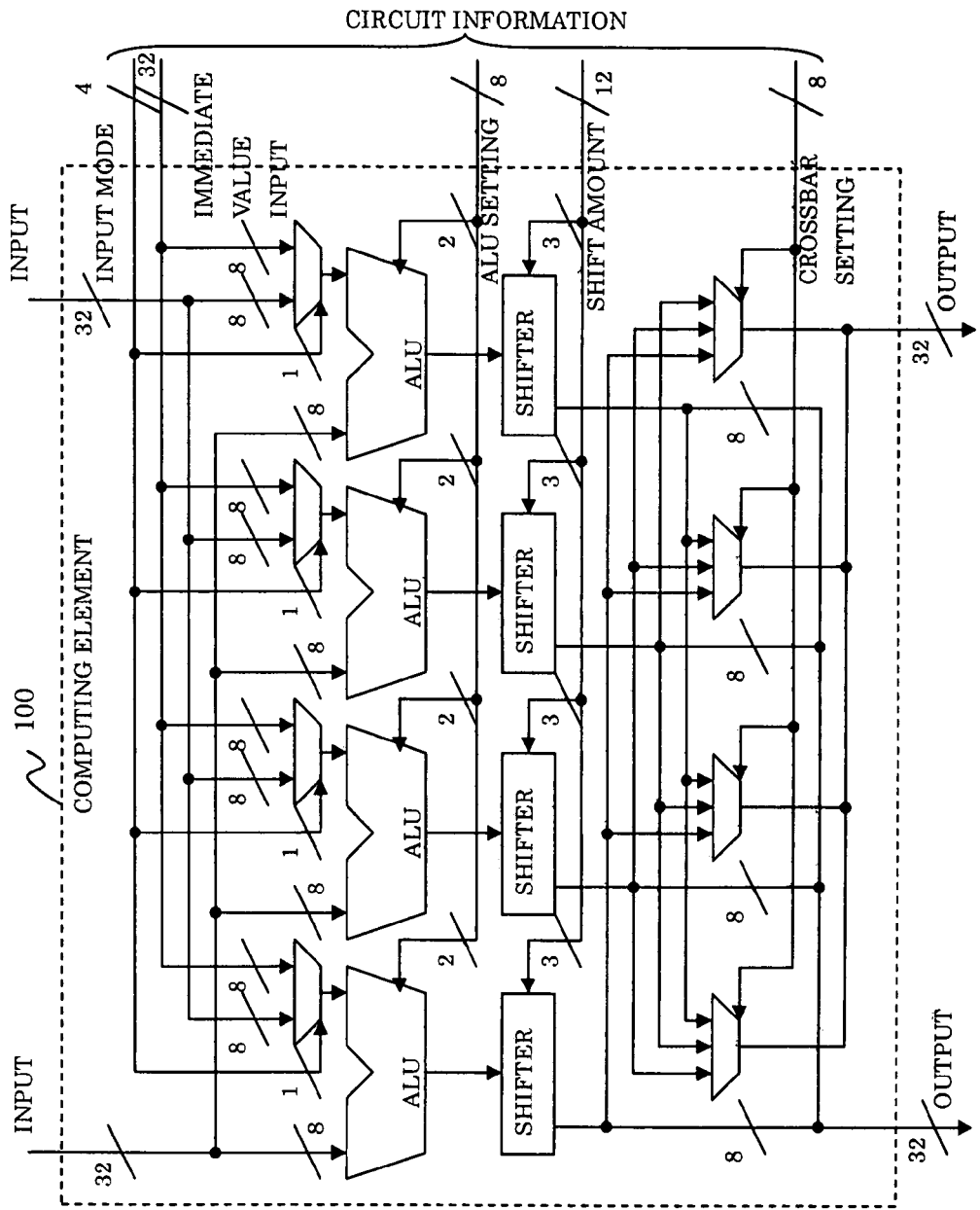
FIG. 3 is a block diagram of a computing element.

FIG. 3 is a block diagram of the computing element 100. The computing element 100 is equipped with four 8-bit ALUs and four shifters, and can construct an execution circuit for performing different computations on two 32-bit inputs in units of 8 bits. A computation result can be computed as one 32-bit output. The computing unit 100 is equipped with crossbars, and can produce, as another output, a result obtained by changing the arrangement order of four 8-bit outputs of the shifters.

Circuit information for each 8-bit computation consists of an input mode (1 bit), a direct value (8 bits), an ALU setting (2 bits), a shift amount (3 bits), and a crossbar setting (2 bits).

The input mode determines whether one input of the ALU should be an immediate value. Thus, the total circuit information for the entire computing element 100 amounts to 64 bits.

The circuit information control device 101 selects one of several items of circuit information in each cycle and transfers the selected item of circuit information to the computing element 100. The circuit information is stored in a storage section of the circuit information control device 101. The selected circuit information item corresponds to a a number indicating a storage location of the circuit information item. A selection rule, or "reconfiguration rule," can be defined as a repeating pattern of numbers indicating positions in the storage section. The reconfiguration rule is sent from the controller 11 to each computing unit 10A-10E, and temporarily stored in the circuit information control device 101 and the control pipeline register 103 of the computing units 10A-10E.

Returning to FIG. 2, the computing element 100 of the computing unit 10A is connected to the input/output buffer 12 via a data line. The computing elements 100 of the computing units 10B-10E are connected to the data pipeline registers 102 of the preceding-stage computing units 10A-10D via data lines. The data pipeline register 102 of the computing unit 10E is connected to the input/output buffer 12 via a data line. In this manner, the computing units 10A-10E constitute a data pipeline for performing computations on data.

The controller 11 is connected to the circuit information control device 101 of the computing unit 10A. The circuit information control devices 101 of the computing units 10B-10E are connected to the circuit information control devices 101 of the preceding-stage computing units 10A-10D, respectively. In this manner, the computing units 10A-10E constitute a pipeline for setting circuit information in advance of data processing.

Furthermore, the controller 11 is connected to the control pipeline register 103 of the computing unit 10A via a control line. The control pipeline registers 103 of the computing units 10B-10E are connected to the control pipeline registers 103 of the preceding-stage computing units 10A-10D via control lines. In this manner, the computing units 10A-10E constitute a control pipeline for controlling operation of the circuit information control devices 101. The control pipeline register 103 of the computing unit 10E may be omitted.

For example, data that is output from the computing element 100 of the computing unit 10A in a certain cycle is stored in the data pipeline register 102 in that cycle. The data then serves as an input to the computing element 100 of the computing unit 10B in the next cycle. In this manner, data is transferred between the computing units 10A-10E in each cycle. This type of transfer is called a "pipeline transfer."

A pipeline transfer is also used for sending circuit information and a reconfiguration rule from the controller 11 through computing units 10A-10E.

Next, a process executed by the semiconductor device 1 according to an embodiment will be outlined. A process executed by the semiconductor device 1 is generally divided into a data-handling process and an initialization process. The initialization process is executed before the data-handling process, and will be described first.

Input data to the semiconductor device 1 is stored in the input/output buffer 12 by an external device such as the processor 2. Furthermore, the external device stores code that prescribes operation of the controller 11, reconfiguration rules, and circuit information to be used by the computing units 10A-10E. The code, reconfiguration rules, and circuit information are all stored in the storage section of the controller 11.

Next, the processor 2 sends a start signal to the controller 11. Upon receiving the start signal, the controller 11 pipeline transfers the circuit information to the computing units 10A-10E and thereby initializes the circuit information control devices 101 of the computing units 10A-10E. The circuit information is stored in the storage sections of the circuit information control devices 101 of the computing units 10A-10E. This completes the initialization process.

Next, the data-handling process will be described.

The controller 11 interprets the code stored in the storage section each cycle, and can pipeline transfer reconfiguration rules each cycle according to the code. The controller 11 can send control information for data reading and control information for data writing to the input/output buffer 12 each cycle according to the code.

When the input/output buffer 12 receives a data read request from the controller 11, the input/output buffer 12 reads and pipeline transfers the data to the computing unit 10A. When the input/output buffer 12 receives a data write request, the input/output buffer 12 writes data output from the computing unit 10E.

Upon receiving a new reconfiguration rule, the computing units 10A-10E change the setting of the circuit information control device 101 according to the reconfiguration rule. The circuit information control device 101 gives circuit information to the computing element 100 according to the new reconfiguration rule.

If the computing units 10A-10E receive no reconfiguration rule in a given cycle, the circuit information control device 101 determines circuit information for that cycle according to a circuit information selection value. The circuit information selection value corresponds to the previously received reconfiguration rule, and provides the selected circuit information for the computing element 100.

Selected circuit information is determined in the following manner. Assume the reconfiguration rule is an alternating pattern of 0s and 1s. Storage locations in the storage section of the circuit information control devices 101 are selected based on the reconfiguration rule. If circuit information corresponding to storage location "0" was selected in the preceding cycle, circuit information corresponding to a storage location "1" is selected in the current cycle. If the circuit information corresponding to a storage location "1" was selected in the preceding cycle, circuit information corresponding to a storage location "0" is selected in the current cycle.

In each computing unit 10A-10E, the computing element 100 constructs an execution circuit according to the circuit information selected by the circuit information control device 101. The execution circuit of the computing element 100 performs a computation on input data, and a computation result is pipeline transferred via the data pipeline registers 102.

When the controller 11 has interpreted all the code, the controller 11 sends a notice of completion of the process to the external device such as the processor 2. This completes the data-handling process.

After waiting a prescribed number of cycles from reception of the process completion notice, the external device such as the processor 2 reads the computation result stored in the input/output buffer 12. The prescribed number of cycles is the number of computing units 10A-10E plus the number of cycles that are necessary for writing the result to the input/output buffer 12.

The data-handling process executed by the semiconductor device 1 according to an embodiment has been described above. Next, detailed embodiments of the controller 11 and the circuit information control device 101 of each computing unit 10A-10E will be described.

First, detailed operations performed by the controller 11 and the circuit information control devices 101 in an initialization process will be described.

Figure 4:
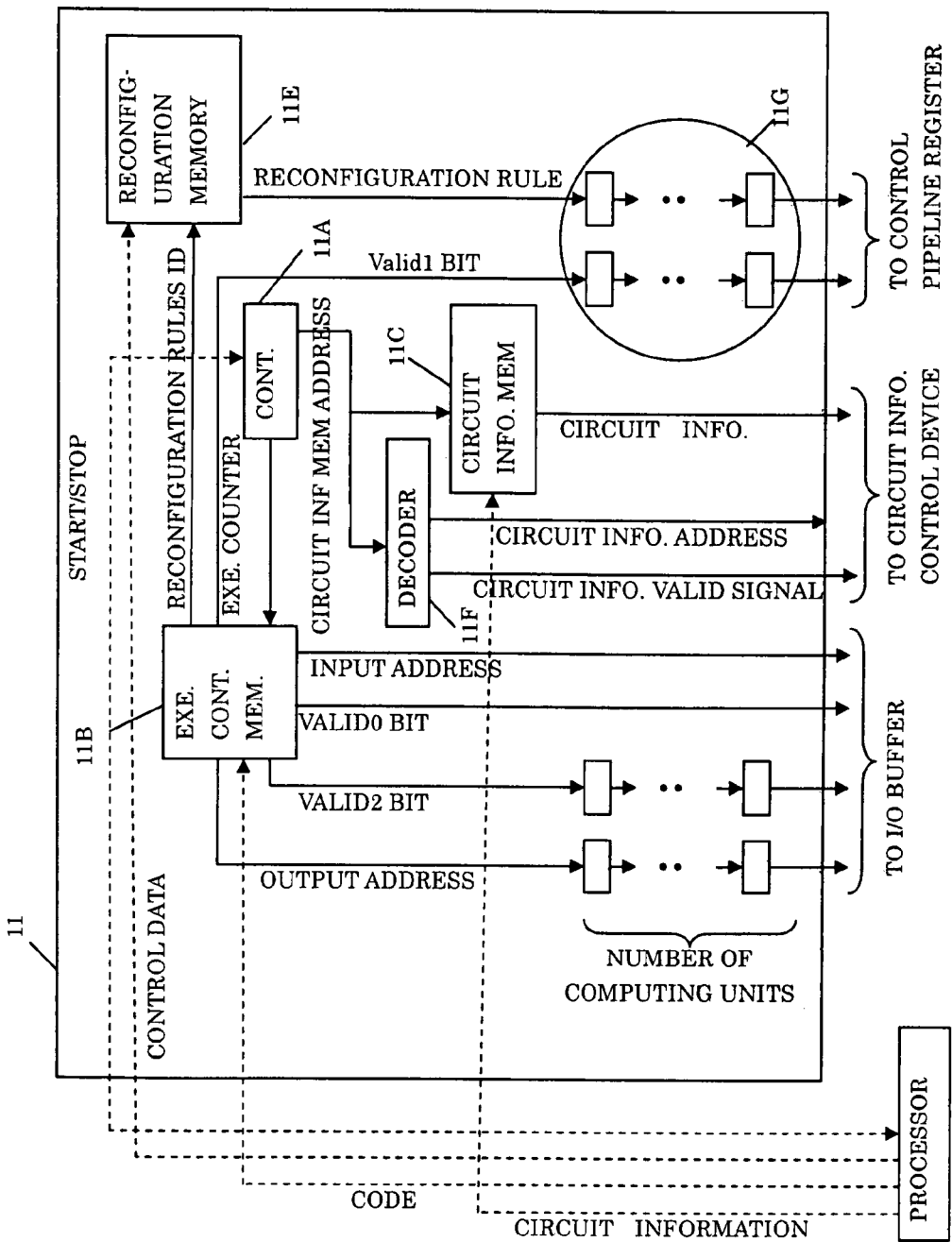
FIG. 4 is a block diagram of a controller.

FIG. 4 is a block diagram of the controller 11. The controller 11 has a control section 11A, an execution control memory 11B, a circuit information memory 11C, are configuration rule memory 11E, and a decoder 11F. The control section 11A is connected to the execution control memory 11B, the circuit information memory 11C, and the decoder 11F. The execution control memory 11B is connected to the reconfiguration rule memory 11E.

Code to be run by the controller 11 is recorded in the execution control memory 11B. Circuit information to be sent to the computing units 10A-10E in an initialization process is recorded in the circuit information memory 11C. Reconfiguration rules to be sent to the computing units 10A-10E in a data-handling process are recorded in the reconfiguration rule memory 11E.

In the initialization process, the control section 11A reads items of circuit information from the circuit information memory 11C and transfers them to the circuit information control devices 101. The decoder 11F generates a circuit information validity signal and a circuit information address.

The circuit information validity signal is a signal that goes to the circuit information control devices 101 of the computing units 10A-10E. The circuit information validity signal indicates whether or not the circuit information control device 101 should store the circuit information transferred from the controller 11. The circuit information address indicates where in the storage section of the circuit information control device 101 the circuit information should be written.

The initialization process is performed before the data-handling process. In the initialization process, code to be recorded in the execution control memory 11B, circuit information to be recorded in the circuit information memory 11C, and reconfiguration rules to be recorded in the reconfiguration rule memory 11E are transferred to the controller 11 from the external device such as the processor 2 and recorded in the respective memories 11B, 11C, and 11E.

The information to be recorded in the memories 11B, 11C, and 11E is generated in advance by a compiler or the like and stored by the external device such as the processor 2. The information is then read from storage and transferred to the controller 11.

When the controller 11 is instructed by the external device such as the processor 2 to start a process, the control section 11A sequentially issues processing addresses to the circuit information memory 11C. Circuit information stored in these addresses is then output from the circuit information memory 11C. The circuit information is sent to the circuit information control devices 101 together with the circuit information validity signal and the circuit information address.

Figures 5, 6:
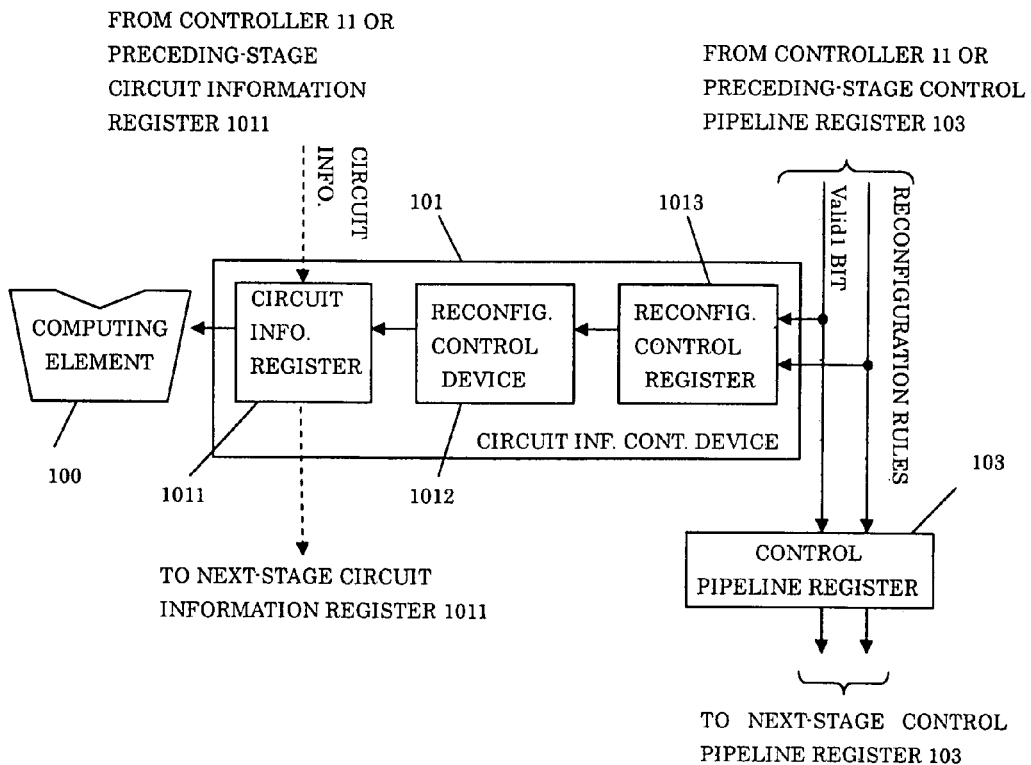
FIG. 5 is a table of decoding rules for a decoder.
FIG. 6 is a block diagram of a circuit information control device.

FIG. 5 is a table of decoding rules, according to which the decoder 11F generates a circuit information address and a circuit information validity signal. The decoder 11F generates them by decoding an address of the circuit information memory 11C that is issued from the control section 11A. In FIG. 5, for example, it is assumed that four items of circuit information can be stored in the circuit information control device 101 of each of the computing units 10A-10E.

The decoder 11F employs the two lower bits of the 5-bit address of the circuit information memory 11C as a circuit information address. The decoder 11F generates a circuit information validity signal so that circuit information will be stored in the correct computing unit 10A-10E. The validity signal employs the three higher bits of the 5-bit address as ascending values that indicate the computing units 10A-10E. Thus, items of circuit information to be stored in the storage section of the circuit information control device 101 of the computing unit 10A at addresses "0" to "3" are recorded in the circuit information memory 11C in order at addresses "0" to "3." Items of circuit information to be stored in the storage section of the circuit information control device 101 of the computing unit 10B at addresses "0" to "3" are recorded in the circuit information memory 11C in order at addresses "4" to "7."

In this manner, items of circuit information for all the computing units 10A-10E are stored in the circuit information memory 11C. The items of circuit information can be stored in the circuit information control devices 101 of the computing units 10A-10E reliably by sending circuit information addresses and circuit information validity signals. The circuit information addresses and circuit information validity signals are generated according to the decoding rules and provided to the computing units 10A-10E by adding them to items of circuit information.

After outputting the circuit information, the control section 11A continues to output an address. This address is the last address of the circuit information memory 11C plus one, which assures that no circuit information will be stored in the circuit information control devices 101 in subsequent cycles.

Next, storing items of circuit information sent from the controller 11 in the circuit information control device 101 of each computing unit 10 will be described.

FIG. 6 shows a more detailed block diagram of each circuit information control device 101. The circuit information control device 101 has a circuit information register 1011, a reconfiguration control device 1012, and a reconfiguration control register 1013. The circuit information register 1011 is connected to the reconfiguration control device 1012, and the reconfiguration control device 1012 is connected to the reconfiguration control register 1013.

The circuit information register 1011 is connected to the controller 11 or the circuit information register 1011 of the preceding computing unit 10A-10D of the pipeline and serves as part of the pipeline for setting circuit information in advance of data processing.

The reconfiguration control register 1013 is connected to the controller 11 or the control pipeline register 103 of the preceding computing unit 10A-10D of the pipeline and serves as part of the pipeline for controlling operation of the reconfiguration control devices 1012.

The reconfiguration control device 1012 and the reconfiguration control register 1013 are not used in the initialization process, so the details of the reconfiguration control device 1012 and the reconfiguration control register 1013 will be reserved for the discussion of the data handling process.

Sending circuit information from the controller 11 and storing the circuit information in the circuit information register 1011 will be described below.

Figure 7:
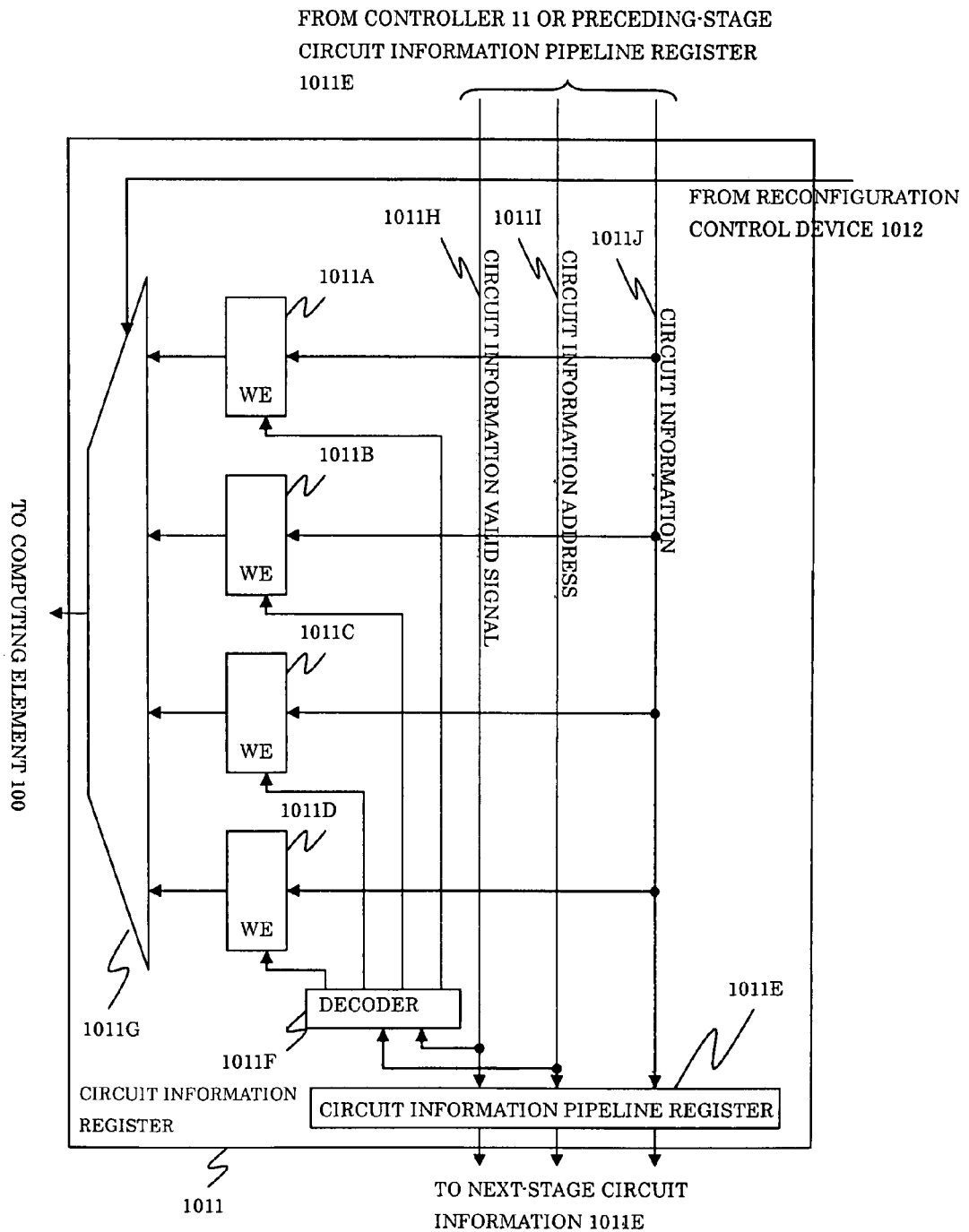
FIG. 7 is a block diagram of a circuit information register.

FIG. 7 is a block diagram of the circuit information register 1011. The circuit information register 1011 has latches 1101A-1011D for storing several items of circuit information. Although four latches 1011A-1101D are disclosed in this example, the number of latches may be increased or decreased as appropriate.

Writing to the latches 1011A-1011D is performed by the controller 11 in a pipelined manner. The controller 11 outputs a circuit information validity signal 1011H, a circuit information address 1011I, and circuit information 1011J. A pipeline for setting the circuit information is formed using circuit information pipeline registers 1011E.

In this embodiment, the circuit information validity signal 1011H is carried by five different signal lines which are assigned to the respective computing units 10A-10E. In the following description, a signal carried by the single signal line that feeds one of computing units 10A-10E will be called a "reference validity signal."

The circuit information address 1011I and the circuit information 1011J are valid only when the reference validity signal has a value of "1."

The circuit information address 1011I is a signal indicating which of the latches 1011A-1011D the circuit information 1011J should be written to. In this example, 2 bits are necessary because the four latches 1011A-1011D exist; "00," "01," "10," and "11" indicate that the circuit information 1011J should be written to the latches 1011A, 1011B, 1011C, and 101D, respectively.

The decoder 1011F designates one of the latches 1011A-1011D to which the circuit information 1011J should be written, by using the reference validity signal and the circuit information address 1011I.

In a data-handling process, one of the latches 1011A-1011D is selected on the basis of an output of the reconfiguration control device 1012 and the circuit information stored therein is supplied to the computing element 100.

The above-described method of writing to each circuit information register 1011 is just an example. For example, the following method is possible. The circuit information address 1011I can be omitted and each circuit information register 1011 can be equipped with a counter. The counter can be incremented each time the reference validity signal becomes a "1." The circuit information 1011J is written to one of the latches 1011A-1011D based on the counter. Another method is to connect the latches 1011A-1011D of all the circuit information registers 1011 to each other. Then, a scan chain can be formed and the latches set by serially sending data to them.

In the method of this embodiment, pipelined circuit information is written in the same manner as the input data to the computing units 10A-10E and the reconfiguration rules. Therefore, the circuit information register 1011 can be updated after initiating a data-handling process. Updating the circuit information register 1011 can be done by sending circuit information from controller 11. The circuit information is necessary for computation on input data, and arrives immediately before the input data reaches the computing unit 10.

The data-handling process executed by the semiconductor device 1 will now be described in more detail. In the data-handling process, the control section 11A of the controller 11 (shown in FIG. 4) interprets the code stored in the execution control memory 11B. The code is interpreted in order, starting from address "0," and the controller 11 operates according to instructions in the code.

FIG. 8 shows an exemplary structure of code that is stored in the execution control memory 11B. In this example, each line of code consists of an input address, a Valid0 bit indicating whether the input address is valid, a reconfiguration rule ID, a Valid1 bit indicating whether the reconfiguration rule ID is valid, an output address, and a Valid2 bit indicating whether the output address is valid. One line of code is executed in each cycle.

When sending control information for reading data to the input/output buffer 12, the control section 11A interprets the input address and the Valid0 bit of a line of code and sends them to the input/output buffer 12. If the Valid0 bit is "1," the input/output buffer 12 reads data that is stored therein at the position indicated by the input address and sends the data to the computing unit 10A.

When sending control information for writing data to the input/output buffer 12, the control section 11A interprets the output address and the Valid2 bit of a line of code and sends them to the input/output buffer 12. These items of control information reach the input/output buffer 12 after a lapse of cycles. The number of cycles is equal to the number of computing units 10A-10E. If the Valid2 bit is "1," the input/output buffer 12 writes data stored in the data pipeline register 102 of the computing unit 10E to the input/output buffer 12 at the position indicated by the output address.

In pipeline transferring a reconfiguration-rule to a computing unit 10A-10E, the control section 11A interprets the reconfiguration rule ID and the Valid1 bit of a line of code. The control section 11A reads the reconfiguration rule from the reconfiguration rule memory 11E using the reconfiguration rule ID as the address, and sends the reconfiguration rule to the control pipeline register 103 of the computing unit 10A together with the Valid1 bit.

The time taken for the controller 11 to send control information for reading data to the input/output buffer 12 until the input data reaches the computing unit 10A needs to be synchronized with the time taken for the controller 11 to send out a reconfiguration rule and a Valid1 bit until they reach the control pipeline register 103 of the computing unit 10A.

To achieve this synchronization, if reading data from the input/output buffer 12 takes several cycles, the time taken until a reconfiguration rule and a Valid1 bit reach the computing unit 10A is increased accordingly. This time can be increased by inserting latches 11G to achieve a timing adjustment of the required number of cycles (see FIG. 4).

The control section 11A sequentially interprets the code stored in the execution control memory 11B starting from address "0." When all the code has been interpreted, the control section 11A sends a notice of completion of the process to the external device such as processor 2 to halt the operation.

Next, computations on input data and constructing an execution circuit during the data handling process will be discussed in more detail. The execution circuit is constructed in the computing element 100 according to a reconfiguration rule received by a computing unit 10.

First, setting the circuit information control device 101 of a computing unit 10A-10E according to a reconfiguration rule sent from the controller 11 will be discussed. The circuit information is supplied from the circuit information control device 101 to the computing element 100, and the computing element 100 is changed accordingly.

A block diagram of circuit information control devices 101 is illustrated in FIG. 6. Several items of circuit information are stored in the circuit information register 1011 as a result of executing the initialization process. The reconfiguration control register 1013 is a register for storing a reconfiguration rule sent from the controller 11. The reconfiguration control device 1012 controls the reading of circuit information from the circuit information register 1011 and sending it to the computing element 100. The reconfiguration control device 1012 reads out circuit information according to the reconfiguration rule stored in the reconfiguration control register 1013.

Figure 9:
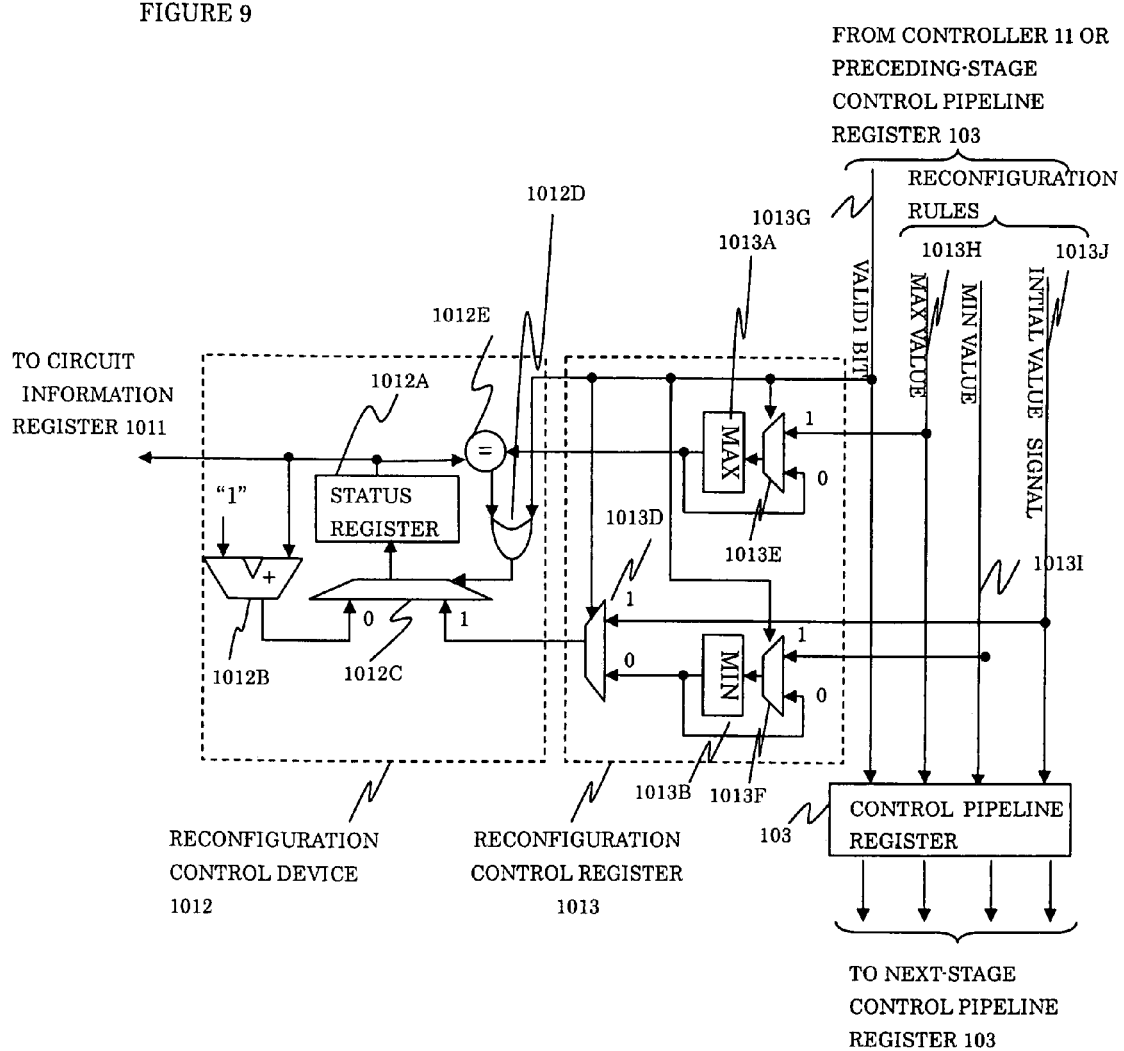
FIG. 9 is a block diagram of a reconfiguration control device and a reconfiguration control register.

FIG. 9 is a block diagram of the reconfiguration control device 1012 and the reconfiguration control register 1013.

First, a Valid1 bit 1013G and a reconfiguration rule are supplied from the controller 11 or the preceding stage in the pipeline. The reconfiguration rule consists of a maximum value signal 1013H, a minimum value signal 1013I, and an initial value signal 1013J. The Valid1 bit 1013G is a "1" only in a cycle in which the reconfiguration rule is valid, and otherwise is a "0." The reconfiguration rule is transferred via the control pipeline register 103 and serves as a reconfiguration rule for the next pipeline stage in the next cycle. The control pipeline for controlling reconfiguration rules is formed in this manner.

The maximum value signal 1013H and the minimum value signal 1013I are stored in a maximum value register 1013A and a minimum value register 1013B, respectively. Multiplexers 1013E and 1013F are set so that the maximum value register 1013A and the minimum value register 1013B are updated only when the Valid1 bit 1013G is "1."

A multiplexer 1013D outputs the value of the initial value signal 1013J if the Valid1 bit 1013G is "1," and outputs the value stored in the minimum value register 1013B if the Valid1 bit 1013G is "0."

In the reconfiguration control device 1012, an OR logic circuit 1012D outputs "1" when the Valid1 bit 1013G is "1," and the output of the multiplexer 1013D is input to a multiplexer 1012C. Thus, the value of the initial value signal 1013J is stored in a status register 1012A.

The value of the status register 1012A is supplied to the circuit information register 1011 as a circuit information reference position.

Unless the value in the status register 1012A coincides with the value in the maximum value register 1013A, the value in the status register 1012A is incremented via an adder 1012B. If the value in the status register 1012A coincides with the value in the maximum value register 1013, the status register 1012A is loaded with the value in the minimum value register 1013B. The comparison between the status register 1012A and the maximum value register 1013 is made by a comparator 1012E. If the values coincide, the output of the OR logic 1012D becomes "1" and hence the multiplexer 1012C outputs the value of the multiplexer 1013D.

With the above loop counter, the output of the reconfiguration control device 1012 to the circuit information register 1011 starts with the value of the initial value signal 1013J. The output is incremented successively and returns to the value of the minimum value register 1013B immediately after becoming equal to the value of the maximum value register 1013A.

The above embodiments of the reconfiguration control device 1012 and the reconfiguration control register 1013 are just examples. The reconfiguration control device 1012 and the reconfiguration control register 1013 may be implemented in more complex or simpler form depending on the use of the semiconductor device 1.

For example, a more complex embodiment of the reconfiguration control device 1012 can be implemented by equipping reconfiguration control device 1012 with a register that can be updated by the controller 11. The value of this register is input to the adder 1012B as one input value instead of "1" so that the 1-cycle increment of the status register 1012A can be set at "2" or more.

A simpler embodiment of the reconfiguration control device 1012 can be implemented by equipping the reconfiguration control device 1012 with only the status register 1012A and the multiplexer 1012C. The multiplexer 1012C outputs the minimum value determined by a reconfiguration rule if the Valid1 bit 1013G is "1," and outputs the value of the status register 1012A if the Valid1 bit 1013G is "0." In this case, each reconfiguration rule only needs to include a minimum value signal and the reconfiguration control register 1013 is not necessary.

Figure 10:
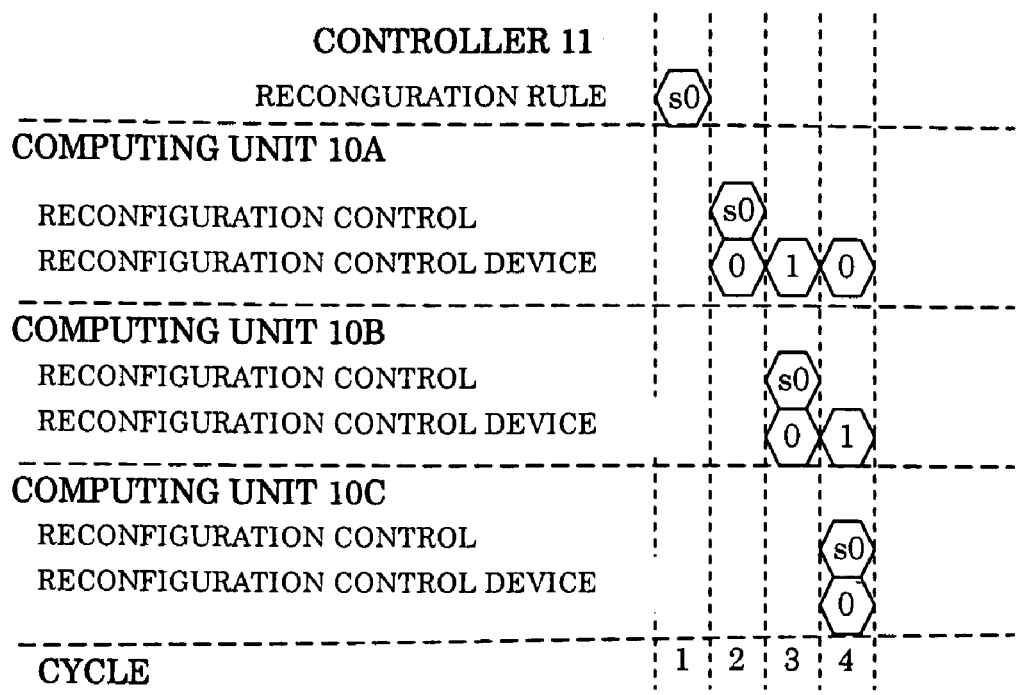
FIG. 10 illustrates updating a reconfiguration control register in a computing unit.

FIG. 10 illustrates updating of the reconfiguration control register 1013 by the controller 11. The output of the reconfiguration control device 1012 is changed accordingly.

In cycle 1, the controller 11 sends a Valid1 bit set at "1" and a reconfiguration rule s0. It is assumed that the reconfiguration rule s0 is set so that the reconfiguration control device 1012 will alternately output "0" and "1." In the implementation example of FIG. 9, the reconfiguration rule s0 is such that the maximum value signal 1013H is "1," the minimum value signal 1013I is "0," and the initial value signal 1013J is "1." It is also assumed that the controller 11 sets the Valid1 bit to "0" from cycle 2 onward.

In cycle 2, the reconfiguration rule s0 is stored in the reconfiguration control register 1013 of the computing unit 10A. At the same time, the reconfiguration control device 1012 of the computing unit 10A is updated and the reconfiguration control device 1012 outputs a "0."

Since the reconfiguration control registers 1013 of the computing units 10B-10E are pipelined via the control pipeline registers 103, the reconfiguration control registers 1013 of the computing units 10B-10E have not been changed yet at the end of cycle 2.

In cycle 3, the reconfiguration control register 1013 and the reconfiguration control device 1012 of the computing unit 10B are updated and the reconfiguration control device 1012 outputs a "0," while the reconfiguration control device 1012 of the computing unit 10A outputs "1."

In cycle 4, the settings of the reconfiguration control register 1013 and the reconfiguration control device 1012 of the computing unit 10C are updated and the reconfiguration control device 1012 outputs a "0." The reconfiguration control device 1012 of the computing unit 10A outputs "0" and the reconfiguration control device 1012 of the computing unit 10B outputs "1."

As described above, in a cycle in which a reconfiguration rule reaches a computing unit 10 via the control pipeline, the settings of the reconfiguration control register 1013 and the reconfiguration control device 1012 of the computing unit 10 are updated and the reconfiguration control device 1012 outputs the initial value indicated by the reconfiguration rule. In the subsequent cycles, the reconfiguration control device 1012 outputs values that conform to the rule stored in the reconfiguration control register 1013.

Next, an exemplary operation is described where computations are performed on input data while the circuit configuration of the computing element 100 is changed. The circuit configuration is changed according to a reconfiguration rule received by a computing unit 10A-10E and computation results are written to the data pipeline register 102. To facilitate the description, it is assumed that the semiconductor device 1 has only two computing units, that is, the computing units 10A and 10B.

FIG. 11 illustrates computations performed in this exemplary operation. FIG. 11 illustrates the execution of a first process where computations e0, e1, e2, and e3 are performed successively on three data items d0, d1, and d2 and a second process where computations e4 and e5 are performed successively on data items d3, d4, and d5.

FIG. 12 illustrates an example of where in the circuit information registers 1011 items of circuit information are stored. Circuit information items A0, A1, and A2 are circuit information items for performing computations e0, e4, and e2, respectively. Circuit information items B0, B1, and B2 are circuit information items for performing computations e1, e5, and e3, respectively.

Circuit information items A0 to A2 are assigned to the computing unit 10A and circuit information items B0 to B2 are assigned to the computing unit 10B. Furthermore, circuit information items A0 and B0, A1 and B1, and A2 and B2 are located at the same locations of circuit information registers 1011. The assignments and storage locations of circuit information items are done in this fashion so that the computations coincide with the data flow through the pipeline of the computing units 10A and 10B.

FIG. 13 illustrates exemplary reconfiguration rules sent from the controller 11. Symbol s0 denotes a reconfiguration rule where "0" is output repeatedly. Symbol s1 denotes a reconfiguration rule where the initial output is "1" and thereafter "0" and "1" are output alternately. Symbol s2 denotes a reconfiguration rule where the initial output is "2" and thereafter "1" and "2" are alternately output. Symbol S3 denotes a reconfiguration rule in which "2" is output repeatedly.

Figure 14:
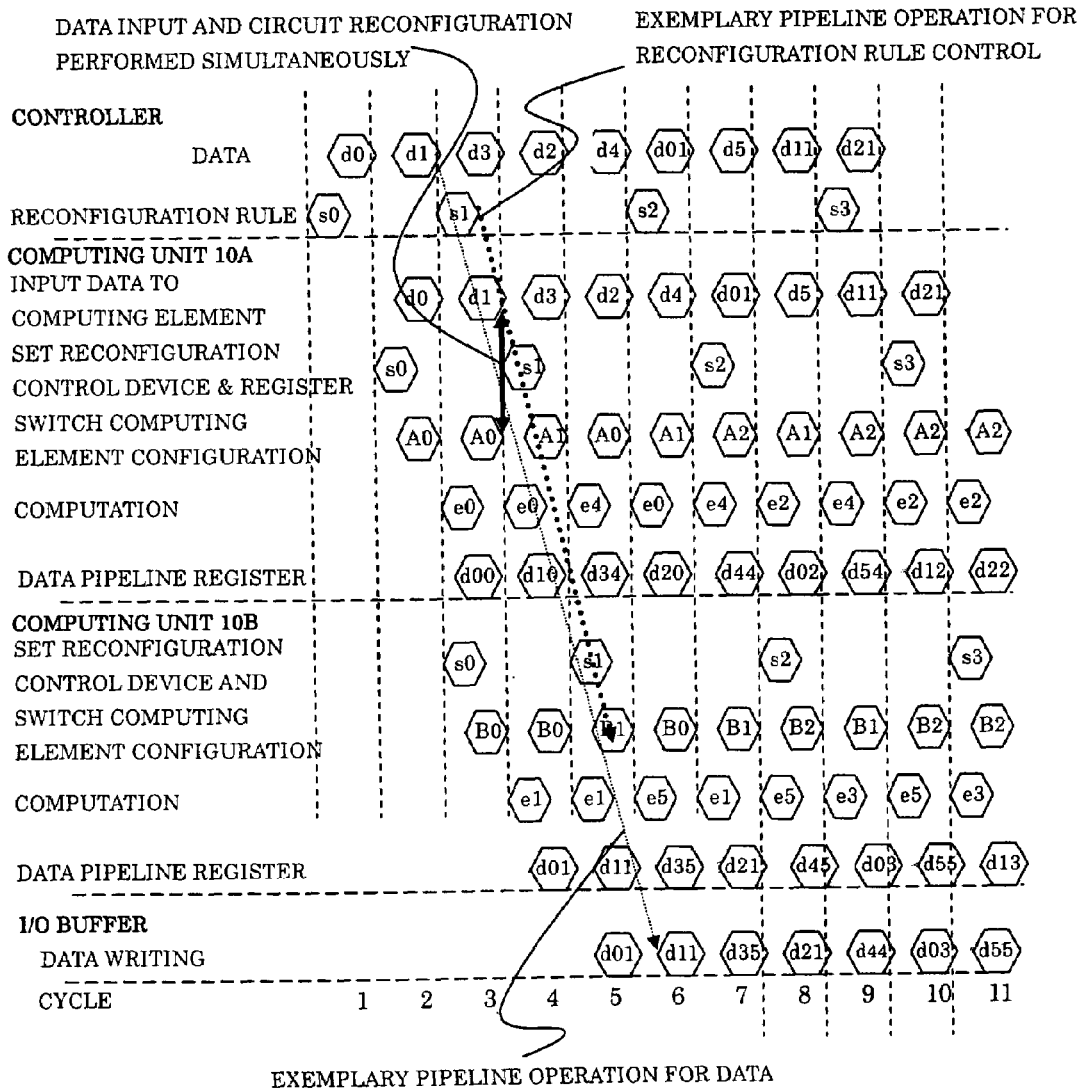
FIG. 14 illustrates performing computations in a semiconductor device while circuits are reconstructed according to reconfiguration rules that are sent from a controller.

FIG. 14 illustrates performing data processing computations in the semiconductor device 1. In this example, it is assumed that data is read from the input/output buffer 12 and input to the computing unit 10A in each cycle in which the controller 11 sends control information for reading data to the input/output buffer 12.

In cycle 1, the controller 11 sends out the reconfiguration rule s0 and also sends out data d0 via the input/output buffer 12.

In cycle 2, the computing unit 10A receives the reconfiguration rule s0 and the settings of the reconfiguration control register 1013 and the reconfiguration control device 1012 are updated. The reconfiguration control device 1012 outputs "0." Location "0" in the circuit information register 1011 is referred to and an execution circuit is constructed in the computing element 100. The execution circuit is constructed according to circuit information item A0, in order to perform computation e0

Also in cycle 2, the controller 11 sends out data d1 via the input/output buffer 12.

In cycle 3, the computing element 100 of the computing unit 10A performs the computation e0 on the input data d0 and writes a computation result d00 to the data pipeline register 102. The reconfiguration control device 1012 outputs "0," location "0" in circuit information register 1011 is referred to, and an execution circuit is constructed in the computing element 100. The execution circuit is constructed according to circuit information item A0 in order to perform computation e0.

Also in cycle 3, the computing unit 10B receives the reconfiguration rule s0 and the settings of the reconfiguration control register 1013 and the reconfiguration control device 1012 are updated. The reconfiguration control device 1012 outputs "0." Location "0" in circuit information register 1011 is referred to and an execution circuit is constructed in the computing element 100. The execution circuit is constructed according to circuit information item B0 in order to perform computation e1.

Also in cycle 3, the controller 11 sends out the reconfiguration rule s1 and also sends out the data d3 via the input/output buffer 12.

In cycle 4, the computing element 100 of the computing unit 10A performs the computation e0 on the input data d1 and writes a computation result d10 to the data pipeline register 102. The computing unit 10A also receives the reconfiguration rule s1, the settings of the reconfiguration control register 1013 and the reconfiguration control device 1012 are updated, and the reconfiguration control device 1012 outputs "1." Location "1" in the circuit information register 1011 is referred to, and an execution circuit is constructed in the computing element 100. The execution circuit is constructed according to circuit information item A1, in order to perform computation e4.

Also in cycle 4, the computing element 100 of the computing unit 10B performs the computation e1 on the input data d0 and writes a computation result d01 to the data pipeline register 102. The reconfiguration control device 1012 outputs "0," location "0" in circuit information register 1011 is referred to, and an execution circuit is constructed in the computing element 100. The execution circuit is constructed according to circuit information item B0, in order to perform computation e1

Also in cycle 4, the controller 11 sends out the data d2 via the input/output buffer 12.

In subsequent cycles, the controller 11 and the computing units 10A and 10B operate in the same manner as described above.

The above-described embodiments make it possible to construct an execution circuit for data computation in each of several pipelined reconfigurable circuits, in order to reduce delay.

With the semiconductor device 1, as shown in data pipeline computations with reference FIG. 14 and as shown in the exemplary pipelined reconfiguration rule control, the controller 11 transfers data and a reconfiguration rule to the computing unit 10A in the same cycle and they are transferred to each downstream computing unit 10A-10E with the same timing in each cycle. By constructing an execution circuit in a computing element immediately after receiving a reconfiguration rule, each computing unit 10A-10E can concurrently reconfigure the computing element 100 and acquire input data, as described with reference to FIG. 14.

It is to be understood that the present invention is not limited to the above embodiments. When the embodiments are put into practice, the constituent components can be modified and embodied without departing from the scope of the invention. Furthermore, various inventions can be created by appropriately combining multiple constituent components disclosed in the above embodiments. For example, some constituent components may be deleted from all the constituent components shown in the embodiments. In addition, constituent components used over different embodiments may be combined appropriately.

What is claimed is:

1. A semiconductor device for performing data processing by performing a plurality of computations in cycles, comprising:
    a pipeline comprising a first computing unit and a second computing unit connected to the first computing unit, the first computing unit comprising:
        a first data line for receiving data;
        a first control line for receiving a rule signal;
        a first circuit information control unit configured to store, before the data processing, first circuit information items, and to output one of the first circuit information items indicated by the rule signal received via the control line in a first cycle of the data processing;
        a first processing element configured to construct a first execution circuit according to one of the first circuit information items, to perform a computation using data from the data line, and to output a first computation result;
        a first data register for storing the first computation result, and for outputting the first computation result in a second cycle; and
        a first control register for storing the rule signal and for outputting the rule signal in the second cycle,
    the second computing unit comprising:
        a second data line for receiving the first computation result;
        a second control line for receiving the rule signal from the first control register
        a second circuit information control unit configured to store, before the data processing, second circuit information items, and to output one of the second circuit information items indicated by the rule signal received via the second control line in the second cycle;
        a second processing element configured to construct a second execution circuit according to one of the second circuit information items, to perform a computation using the first computation results, and to output a second computation result;
        a second data register for storing the second computation result, and for outputting the second computation result in a third cycle; and
        a second control register for storing the rule signal and for outputting the rule signal in the third cycle, and
    a controller configured to control output timing of the rule signal to the first control line and to control output timing of the data to the first data line in the first cycle, so that the first computing unit and the second computing unit are operated as a pipeline.

2. The semiconductor device according to claim 1, further comprising an input/output buffer connected to:
    an external device;
    the first data line; and
    the second data register,
    the input/output buffer temporarily storing data to be processed.

3. The semiconductor device according to claim 1, wherein each of the first control unit and second control unit has a selection control circuit which selects a certain number of stored circuit information items in a predetermined order, the certain number of stored circuit information items being selected in cycles in which no rule signal is supplied via the control line.

4. The semiconductor device according to claim 3, wherein:
    the selection control circuit comprises a loop counter that is set to a minimum value after reaching a maximum value, and
    an initial value, the minimum value, and the maximum value are set by rule signal.

5. The semiconductor device according to claim 4, wherein the loop counter is used to select one of the first circuit information item or the second circuit information item for output by the first circuit information control unit or the second circuit information control unit.

6. A method of controlling a pipeline which comprises:
    a first computing unit comprising:
        a first data line for receiving data;
        a first control line for receiving a rule signal;
        a first circuit information control unit configured to store, before the data processing, first circuit information items, and to output one of the first circuit information items indicated by the rule signal received via the control line in a first cycle of the data processing;
        a first processing element configured to construct a first execution circuit according to one of the first circuit information items, to perform a computation using data from the data line, and to output a first computation result;
        a first data register for storing the first computation result, and for outputting the first computation result in a second cycle; and
        a first control register for storing the rule signal and for outputting the rule signal in the second cycle, and
    a second computing unit comprising:

a second data line for receiving the first computation result;

a second control line for receiving the rule signal from the first control register a second circuit information control unit configured to store, before the data processing, second circuit information items, and to output one of the second circuit information items indicated by the rule signal received via the second control line in the second cycle;

a second processing element configured to construct a second execution circuit according to one of the second circuit information items, to perform a computation using the first computation results, and to output a second computation result;

a second data register for storing the second computation result, and for outputting the second computation result in a third cycle; and a second control register for storing the rule signal and for outputting the rule signal in the third cycle, the method comprising:

controlling output timing of the rule signal to the first control line; and controlling output timing of the data to the first data line in the first cycle, so that the first computing unit and second computing unit are operated as a pipeline.

7. The method according to claim 6, further comprising storing data to be processed in an input buffer connected to:
   an external device,
   the first data line, and
   the second data register.

8. The method according to claim 6, further comprising selecting a plurality of stored circuit information items in a predetermined order with a selection control circuit of the first control unit or the second control unit, the stored circuit information items being selected in cycles in which no rule signal is supplied via the control line.

9. The method according to claim 6, further comprising:
   setting a loop counter to a minimum value after the loop counter reaches a maximum value, and
   supplying an initial value, the minimum value, and the maximum value in rule signal.

10. The method according to claim 9, comprising selecting one of the first circuit information item or the second circuit information item for output by the first circuit information control unit or the second circuit information control unit, based on the loop counter.

* * * * *